Aug. 17, 1926.

C. F. WILEY 1,596,134

GAS RANGE

Filed Dec. 16, 1924      3 Sheets-Sheet 1

INVENTOR:
Clarence F. Wiley
BY Crale + Hayes
ATTORNEYS:

Aug. 17, 1926.

C. F. WILEY

GAS RANGE

Filed Dec. 16, 1924  3 Sheets-Sheet 3

1,596,134

INVENTOR:
Clarence F. Wiley
By
ATTORNEYS:

Patented Aug. 17, 1926.

1,596,134

UNITED STATES PATENT OFFICE.

CLARENCE F. WILEY, OF TAUNTON, MASSACHUSETTS, ASSIGNOR TO MAGEE FURNACE COMPANY, OF BOSTON, MASSACHUSETTS, A CORPORATION OF MASSACHUSETTS.

GAS RANGE.

Application filed December 16, 1924. Serial No. 756,268.

The invention relates to a gas range having an oven containing a broiler burner and associated with the oven an oven burner which heats it for baking purposes.

The difficulty in providing an oven burner with a thermostatic control in an arrangement where a broiler burner is contained within the oven, resides in the fact that the heat from the broiler burner is liable to so affect the thermostatic device located within the oven and controlling the oven burner as to make the admission of gas to the oven burner a more or less dangerous and uncertain factor. For example, assuming gas to the oven burner to be shut off and the broiler burner to be in operation: The heat from the broiler burner may so influence the thermostatic device as to effect a closure of the gas connection leading to the oven burner. Assuming now gas to the broiler burner to be shut off and the cock controlling the admission of gas to the oven burner opened before the oven has been allowed to cool: In point of fact no gas may then be permitted to issue to the oven burner inasmuch as it is shut off by the action of the thermostatic device affected as it has been by the heat from the broiler burner. Attempt then being made to light the oven burner the operator will either see that the oven burner cannot be lighted or, not noting this, will leave the cock controlling the admission of gas to the oven burner open with no lighting of the burner. As soon as the cooling of the oven has effected a release of the thermostatic device the oven will then become filled with gas. If attempt is then made to light the oven burner serious results may ensue. The invention overcomes these difficulties.

The invention can best be seen and understood by reference to the drawings in which an embodiment thereof is shown and in which—

Referring to the drawings:—

Figure 1:
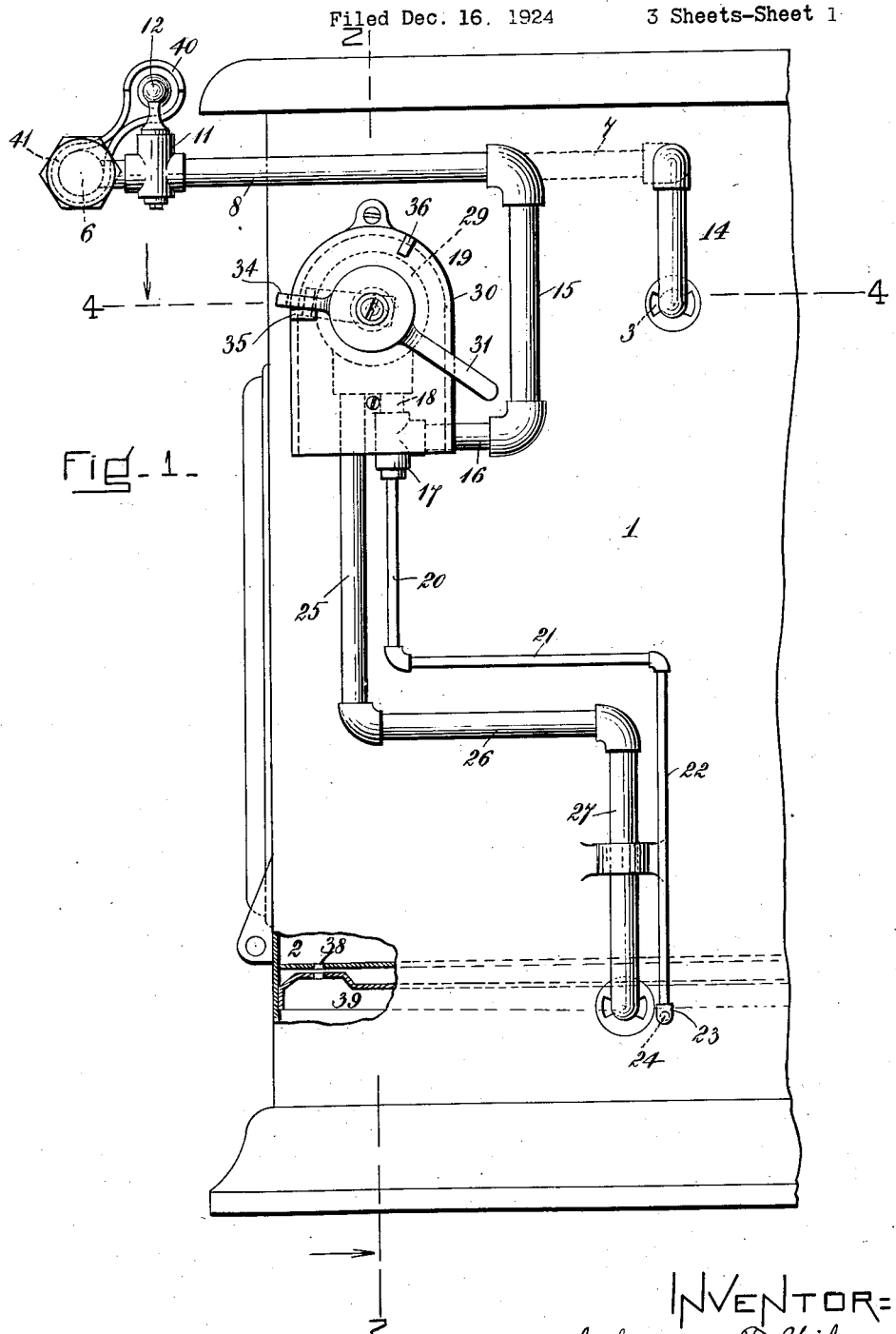
Figure 1 is a side elevation of a range equipped with an arrangement embodying the invention, such portion only of the range being shown as is necessary for a proper understanding of the invention.
Figure 2:
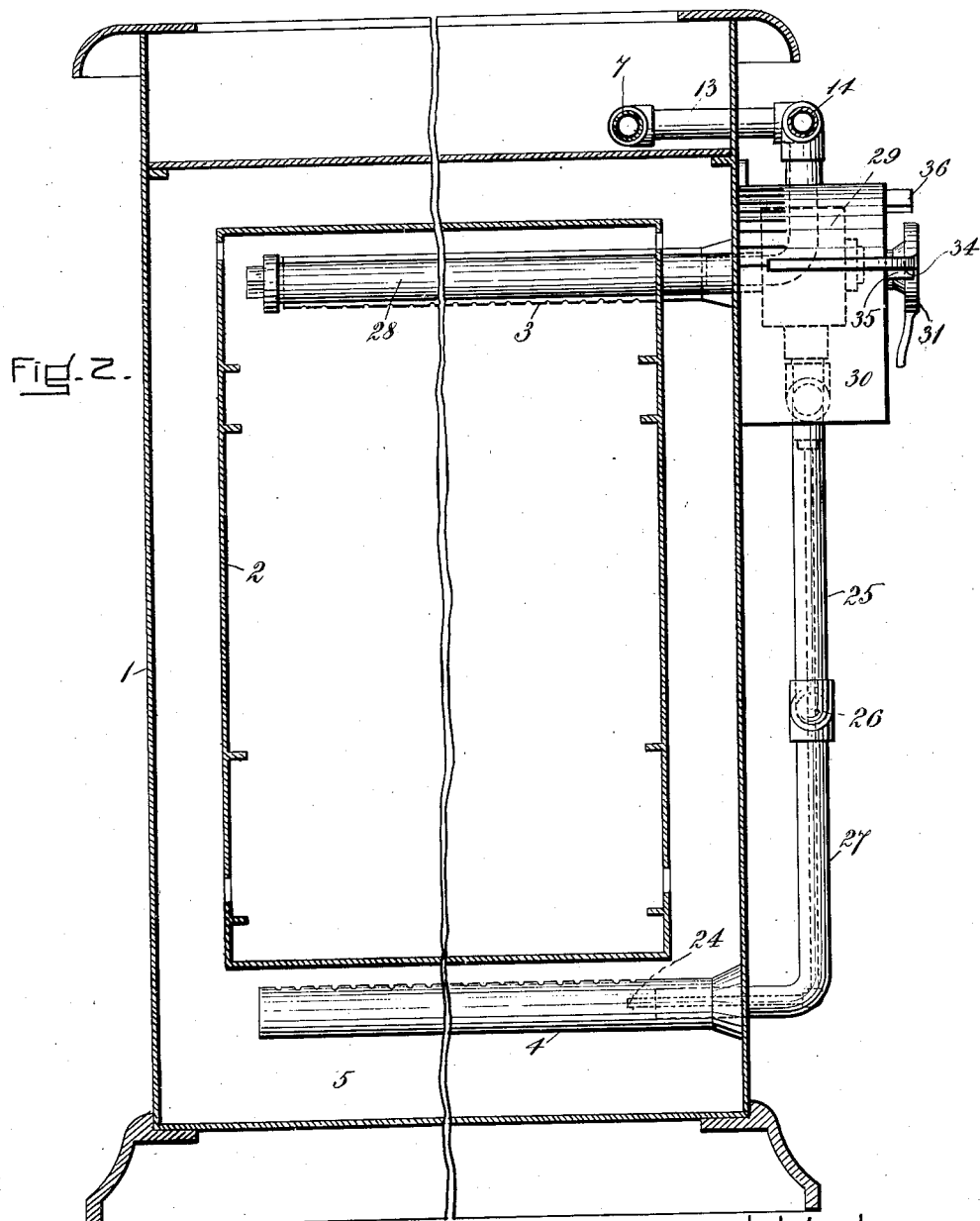
Fig. 2 is a section on the line 2—2 of Fig. 1.

1 represents the body of the range. 2 is the oven. 3 is the broiler burner located in the top of the oven. 4 is an oven burner located in a chamber 5 beneath the oven, heat from the oven burner passing upwardly by the sides of the oven and entering it by way of openings through the walls of the oven as is customary in constructions of this kind.

6 is a gas manifold preferably located in the front at the top of the range. To this manifold are connected pipes 7 and 8, respectvely, through which gas is directed to pass to the respective broiler and oven burners. The passage of gas through the pipe 7 admitting gas to the broiler burner is controlled by a cock 9 having a handle 10; the passage of gas through the pipe 8 admitting gas to the oven burner by a cock 11 having a handle 12. The pipe 7 extends inwardly through the top of the range and thence by pipe connections 13 and 14 connects with the broiler burner for admitting gas to this burner as is customary in such connections. The pipe 8 extends inwardly by the side of the range and is continued by pipe connections 15 and 16 to connect with a coupling 17 at which point the pipe connection is divided, one connection 18 extending upwardly to connect with a thermostatic device 19 through which the gas is directed to pass, and the other connection 20 extending downwardly through a number of connected pipe sections 21, 22 and 23 to connect with a pilot light 24 located adjacent the oven burner for lighting this burner.

Special reference to the thermostatic device 19 will presently be made, but it will be explained at this point that gas admitted to pass through the thermostatic device is directed therefrom through pipe connections 25, 26 and 27 to the oven burner for admitting gas to this burner as is customary in such connections.

The thermostatic device 19 may be any one of a variety of devices comprising a valve and associated therewith a thermostatic element located within the oven, as for example, the thermostatic device shown and described in Letters Patent of the United States No. 998,262 of July 11, 1911. In the drawings, 28 represents the thermostatic element located in the oven, preferably in the top thereof, and 29 is the valve located outside the oven and controlled by the thermostatic element to control the supply of gas admitted to the oven burner 4. The valve 29 is contained within a casing or housing 30 attached to the side of the range. It will also be observed that the pipes 18 and 25 in the pipe connection leading to the oven burner connect with the valve 29 inside the housing 30. The pipes 18 and 25 lead, respectively, to and from the valve, the passage between the pipes being controlled by the valve substantially as described in said patent.

The thermostatic device is provided as is customary in such devices with means for setting the valve to become actuated by the thermostatic element within the oven at any determinate oven temperature. The means shown for setting the valve comprises a hand-operated lever 31 outside the housing 30. This lever is secured by a threaded connection 32 to the end of a yoke 33 located inside the housing 30 and which connects with the valve for operating it as the lever is turned, the threaded connection 32 extending through the side of the housing to connect with the end of the yoke. The lever 31 carries a pointer 34 which turns over the front face of the housing 30 which may be provided with the usual indications of different ranges of oven temperature at which the lever may be set for controlling the temperature of the oven as is customary in such connections. Stops 35 and 36 on the side of the housing 30 define the limits within which the lever 31 may be turned.

The oven burner is lighted preferably through an opening 38 in the bottom of the oven at the front as is customary in such ovens and the flame is directed to the pilot light 24 by way of any of the well known forms of lighter 39 located within the chamber 5.

Figure 3:
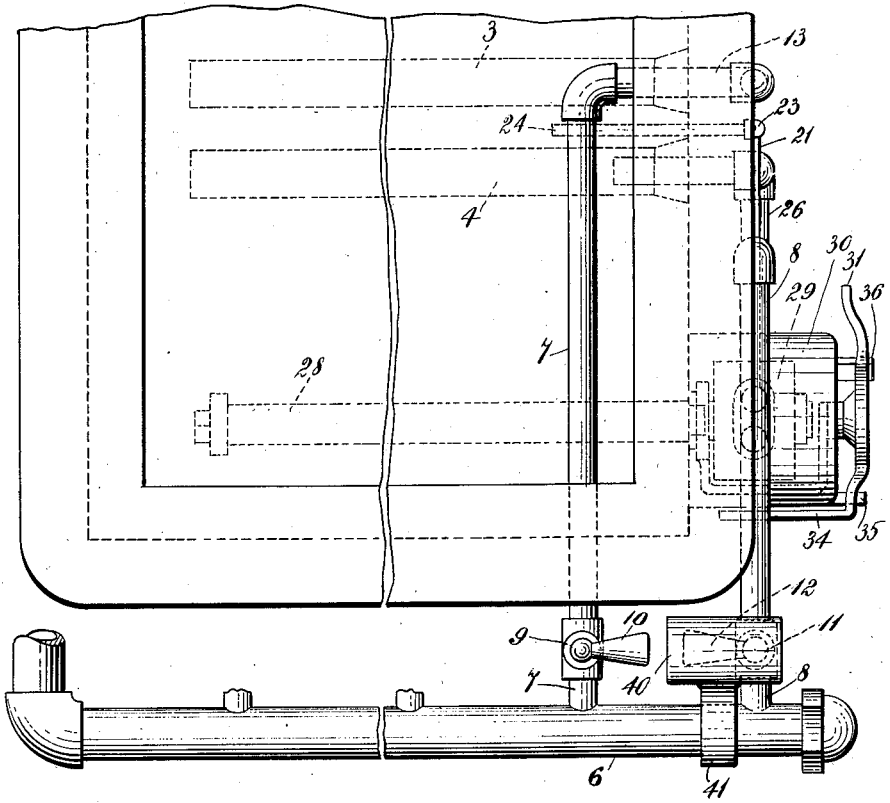
Fig. 3 is a plan.
Figure 4:
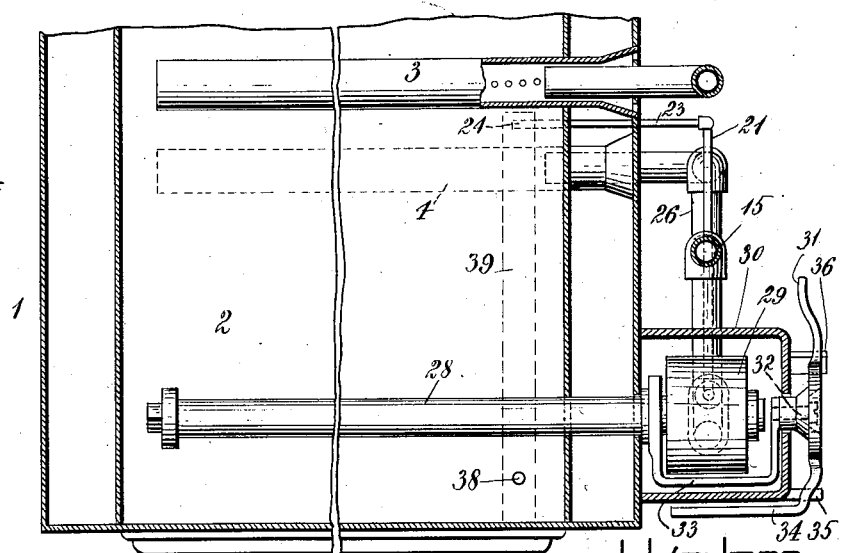
Fig. 4 is a section on the line 4—4 of Fig. 1.

Means is also provided whereby the cocks 9 and 11 respectively controlling the supply of gas to the respective broiler and oven burners cannot both be turned on or opened at the same time and one cannot be opened until the other has been fully closed. It will be observed by reference to Fig. 3 that the handles 10 and 12 to the cocks 9 and 11, which control respectively the passage of gas to the broiler and oven burners through the pipes 7 and 8 leading from the manifold 6, occupy positions when closed in alignment with one another parallel with the gas manifold 6 with the inner ends of the handles of the cocks facing and spaced from one another. Arranged to be slidable over these handles is a sleeve 40. The size and arrangement of this sleeve is such in relation to the handles that as the sleeve is moved to the right or left only one or the other of the handles is permitted to be moved to a position where it opens the cock controlled by it and neither of the cocks can be opened until the handle controlling the other cock has been moved to a position where it closes the cock and the sleeve then slid over the handle. The sleeve 40 is carried by a collar 41 preferably integral with the sleeve and slidable upon the gas manifold 6, the engagement of this collar with the pipes 7 and 8 defining the limits within which the sleeve 36 is laterally movable for safeguarding the cocks.

The general operation is as follows: It will be assumed that gas is being admitted to the broiler burner 3 by the opening of the cock 9 and that this burner is in operation. The heat from this burner may so affect the thermostatic element 28 as to effect a closure of the valve controlling the passage of gas to the oven burner. The operation of the broiler burner having been concluded, attempt is now made to light the oven burner before the thermostatic element 28 has been allowed to cool. The cock 11 controlling the flow of gas to the oven burner is first opened. As previously explained, the connections controlled by this cock leading from the gas manifold are separated or divided at the point of the coupling 17 in the connections, one series of pipe connections leading from the coupling to the pilot light 24 for the oven burner and the other connections leading through the thermostatic device and thence to the oven burner. When attempt is made to light the oven burner, assuming the conditions to be as above outlined, the operator will attempt the lighting in the usual manner at the point of the opening 38 in the bottom of the oven and the pilot light 24 will thereupon become lighted for gas is being admitted to it inasmuch as the gas connections leading to the pilot light do not pass through the thermostatic device. Gas may not then be admitted to the oven burner as the oven may still be hot and the thermostatic element 28 still remain so influenced as to shut off the supply of gas to the oven burner. The pilot light, however, will continue to burn and as soon as the oven and thermostatic element 28 cool sufficiently gas will be admitted to the oven burner which will thereupon become lighted by the pilot light. Such operation is independent of any determinate setting of the valve controlled by the thermostatic device for any given oven temperature, the operation being the same under all conditions, the only difference being that under some circumstances the oven burner will become lighted sooner than under others when the oven burner is used immediately after the broiler burner has been in use.

Having thus fully described my invention, I claim and desire to secure by Letters Patent of the United States:—

1. In a gas range, the combination comprising an oven, a broiler burner located in the oven, a gas fixture by which gas is admitted to the broiler burner, a cock controlling the passage of gas through said fixture, an oven burner for heating the oven, a pilot light for lighting the oven burner, a gas fixture common to both the oven burner and its pilot light and connecting by branch connections with the oven burner and its pilot light respectively, a cock controlling the passage of gas through said fixture common to both the oven burner and its pilot light, a thermostatic device located in the branch connection leading to the oven burner by which gas admitted through said connection will be directed to pass through said thermostatic device and be controlled thereby, said thermostatic device having an actuating thermostatic element located within the oven, and means whereby the pilot light will be lighted independently of the lighting of the oven burner upon the opening of the cock which controls the admission of gas to said oven burner and pilot light respectively.

2. In a gas range the combination comprising an oven, a broiler burner located in the oven, a gas fixture by which gas is admitted to the broiler burner, a cock controlling the passage of gas through said fixture, an oven burner for heating the oven, a pilot light for lighting the oven burner, a gas fixture common to both the oven burner and its pilot light and connecting by branch connections with the oven burner and its pilot light respectively, a cock controlling the passage of gas through said fixture common to both the oven burner and its pilot light, a thermostatic device located in the branch connection leading to the oven burner by which gas admitted through said connection will be directed to pass through said thermostatic device and be controlled thereby, said thermostatic device having an actuating thermostatic element located within the oven, and means controlling said cocks whereby both can not be opened at the same time.

CLARENCE F. WILEY.